PATTERN RECOGNITION SYSTEM WITH ADAPTIVE SCANNING MEANS

Filed Aug. 9, 1967 4 Sheets-Sheet 1

INVENTORS
SHINICHI HANAKI
KAZUO KIJI
BY
OSTROLENK, FABER, GERB & SOFFEN
ATTORNEYS

PATTERN RECOGNITION SYSTEM WITH ADAPTIVE SCANNING MEANS

Filed Aug. 9, 1967

INVENTORS
SHINICHI HANAKI
KAZUO KIJI
BY
OSTROLENK, FABER, GERB & SOFFEN
ATTORNEYS

PATTERN RECOGNITION SYSTEM WITH ADAPTIVE SCANNING MEANS

Filed Aug. 9, 1967 4 Sheets-Sheet 3

INVENTORS
SHINICHI HANAKI
KAZUO KIJI
BY
OSTROLENK, FABER, GERB & SOFFEN
ATTORNEYS

PATTERN RECOGNITION SYSTEM WITH ADAPTIVE SCANNING MEANS

Filed Aug. 9, 1967

INVENTORS
SHINICHI HANAKI
KAZUO KIJI
BY
OSTROLENK, FABER, GERB & SOFFEN
ATTORNEYS

United States Patent Office 3,533,068
Patented Oct. 6, 1970

3,533,068

PATTERN RECOGNITION SYSTEM WITH ADAPTIVE SCANNING MEANS

Shinichi Hanaki and Kazuo Kiji, Tokyo, Japan, assignors to Nippon Electric Company, Limited, Minato-ku, Tokyo, Japan Filed Aug. 9, 1967, Ser. No. 659,480
Claims priority, application Japan, Aug. 18, 1966, 41/54,381
Int. Cl. G06k 9/12
U.S. Cl. 340—146.3 4 Claims

ABSTRACT OF THE DISCLOSURE

A character recognition system having a flying spot scanner for scanning each character and converting the reflected light picked up into electrical signals. The electrical signal pattern representing the scanned character is examined by correlation circuits to determine its identity. These correlation circuits generate a signal to initiate a rescanning operation in the case where a character fails to be properly recognized. In accordance with those features of a character which fails recognition which have been recognized as being present, a selected portion or selected portions of the region of the character are illuminated more brightly during the rescanning operation to facilitate correct identification of the rescanned character.

The instant invention relates to pattern recognition systems, and more particularly to a novel pattern recognition system for scanning characters, symbols, and the like, and which may be adaptively converted into an information mode for rescanning of an ambiguous character or symbol wherein, dependent upon the particular class or category of ambiguity, a portion or portions of the scanning field are illuminated more brightly than the remaining portion of the scanning field in performing a second scan of the ambiguous character or symbol in order to resolve the ambiguity.

A large class of conventional pattern recognition devices perform character recognition by a converter means which converts scanned information into predetermined object patterns. For example, the converter may convert spatial patterns of an optical mode into signals of an electrical mode and store these electrical signal patterns for the purpose of simplifying subsequent handling. For example, a character or symbol is scanned and the optical mode is converted to an electrical signal pattern mode; the stored electrical patterns are then extracted from memory, compared with the received pattern, and the correlation therebetween then determines the identity of the character or symbol which has been scanned. Characters and/or symbols may be either typed, printed, written or otherwise developed upon a surface such as a sheet of paper, card or any other suitable document. In the case of typed alphabetic characters, the darkness of each portion of a letter typed on a document may be found to be non-uniform, owing to a variety of different causes, and, in many cases, portions of the typewritten alphabetic letter can be partially dim. In many conventional pattern recognition systems, the partially dim or non-uniform pattern portions may be scanned with optical means and the reflected light from the scan point which is an analog quantity is converted upon reception into an electrical signal. The electrical signals are passed if above a certain threshold level and converted into binary digital signals. In this type of conversion method of the information mode, since the conversion level cannot be altered in a corresponding manner with regard to the condition of the character information being scanned, the level of the above described electrical signal which lies below the threshold level is neglected, thereby resulting in a shortcoming in that important portions of the original information mode may be lost at the time of conversion from optical to electrical form so that the character being scanned cannot be sufficienaly recognized, regardless of how complex subsequent electronic handling of the signals may be.

In the above example, if the threshold level is preadjusted to make a dim portion recognizable, the portion of a character of normally sufficient contrast is recognized as being unnecessarily large and accordingly is apt to convert a portion of the scanning region adjacent the character, which may be white, into black, and thereby convert that portion into an erroneous digital signal. In some cases, the quality of a pattern developed from a scan as a result of a photoelectric conversion is extremely poor. As a means of eliminating the above short-comings, the slicing or threshold level is selected to be fairly low so that even a white portion adjacent the actual character pattern has a tendency to generate a signal indicating that it is a black portion, and thereby the signal-to-noise ratio of the obtained electrical pattern is apt to be quite low.

However, it becomes more important to obtain a more exacting electrical pattern, even if a portion of that pattern may be lost, than to obtain an electrical pattern having a great deal of noise due to a low signal-to-noise ratio. Therefore, it is common practice to employ a comparatively high slicing or threshold level. As a result of this, in cases where patterns having shapes which are considerably different from one another, such characters are easily recognizable and distinguishable from one another, in spite of the fact that only roughly extracted features are available and that some portions of the character features are lost. However, in the case where one or more patterns closely resemble one another, it is very difficult to determine which of the resembling patterns has actually been scanned unless their features are extracted in a more critical manner. If a portion of the pattern is lost, satisfactory discrimination becomes extremely difficult since one resembling pattern may be confused with another. For example, a letter E whose lower end has been lost can easily be mistaken for F, or when a pattern is very close to another pattern class, there occurs a problem of discrimination, for example, between a letter O whose upper portion is missing and a letter U, thereby resulting in difficulty in recognition of received characters.

In addition thereto, if patterns of letters are taken as one example, in most cases it is undesirable to recognize a pattern belonging to one class of letters as one of another class than to refuse the recognition because of difficulty in discrimination. Therefore, if there are letters whose shapes have similarities, their identity can be determined by severe and critical extraction of their features so that there will be a fair chance for rejecting a letter even if a portion of that letter is missing or has been printed only lightly due to a non-uniform printing operation.

It is conventional to provide a device which permits a recognition of the pattern several times. Such devices operate to shift the level of the information mode conversion uniformly over the entire pattern by means of lowering the threshold level, for example. However, in the case where a dim portion of a character is caused to be converted into a pattern by uniformly lowering the threshold level, an unfavorable result occurs in the normal contrast portions of the character, causing this approach to be rather ineffective.

The instant invention is characterized by providing a pattern recognition system having means for functionally performing an adaptive scanning operation which partially shifts the criterion of conversion with reference to the incomplete features of the information previously obtained when the previously obtained pattern is not correctly recognizable by reason of insufficient information being obtained after the processing of the detected features.

In the case of a pattern recognition device which handles collective patterns or letters having portions thereof which are lighter than normal contrasts or which have been lost, the instant invention provides a pattern recognition device of high reliability by positively verifying patterns or letters which may be easily mistaken for another character which it may slightly or closely resemble.

The instant invention is comprised of pattern scanning means such as, for example, a flying spot scanner which scans characters imprinted upon a paper, card or other document. The beam of the scanner is focused upon the document surface and scans an area containing a character. The reflected light of the beam is sensed by a light-sensing means and preferably amplified and applied to delay means. Outputs are taken at spaced intervals along the delay line representative of elemental regions of the entire scanning field, and are applied to correlation circuits which are arranged so as to separate letters of the alphabet, for example, into four basic groups. The first group containing the letters A, H and X, for example, contains characters whose shapes do not resemble any other alphabetic character. These characters are the easiest ones to identify, and may, therefore, be accurately identified, even though some of the information relating to elemental areas of the character are lost. The remaining groups may, for example, be B, R, P; E, F, L; I, T; and O, U and C. In the case of the latter three groups, it must be specified that comparatively severe criteria are applied to these letters for recognition purposes so that they may not be mistaken for the other letters which they may resemble. Accordingly, if an electrical signal identifying an important elemental portion of the scanning area is missing, characters of the latter three groups will fail to produce an output sufficient for recognition, which situation occurs rather frequently.

In the case where insufficient information is made available to the correlation circuitry to identify a character, a rescanning circuit is enabled, causing a rescan of the character which has just been scanned and which has failed to produce information sufficient to recognize its identity. In accordance with the missing elemental information, the rescanning control circuit is caused to operate the flying spot scanner in such a manner as to illuminate one or more portions of the scanning field more brightly than the remaining portion of the scanning field, wherein those more brightly illuminated portions correspond to those regions of the scanning field in which significant elemental information has been lacking. The light reflected from the rescanned character is again picked up by the photosensitive means and reinterpreted by the correlation circuitry in order to resolve the previous ambiguous condition.

It is, therefore, one object of the instant invention to provide a novel pattern recognition system having means for scanning a character, means for determining the identity of the scanned character, and means for rescanning the character by illuminating certain portions of the scanned field more brightly than the remaining portion of the field when the information made available as a result of the initial scan proves insufficient to identify the characters scanned.

Another object of the instant invention is to provide a pattern recognition system comprised of a flying spot scanner for scanning a character provided on a document surface, means for picking up the reflection of the beam scanning the character, means for identifying the scanned character and final means for operating the flying spot scanner so as to illuminate one or more portions of the scanning field more brightly than the remaining portion of the scanning field when the character being rescanned has provided insufficient information to adequately identify the character.

Yet a further object of the instant invention is to provide a pattern recognition system comprised of a flying spot scanner for scanning a character provided on a document surface, means for picking up the reflection of the beam scanning the character, means for identifying the scanner character and final means for operating the flying spot scanner so as to illuminate one or more portions of the scanning field more brightly than the remaining portion of the scanning field when the character being rescanned has provided insufficient information to adequately identify the character, wherein said final means causes said flying spot scanner to more brightly illuminate those portions of the scanning field wherein significant elemental information relating to the identity of the scanned character have not been satisfactorily recognized.

These and other objects of the instant invention will become apparent when reading the accompanying description and drawings in which:

FIGS. 1 and 3 each show a plurality of alphabetic characters wherein portions of selected characters have been omitted for purposes of describing the operation of the instant invention.

Figures 1, 6:
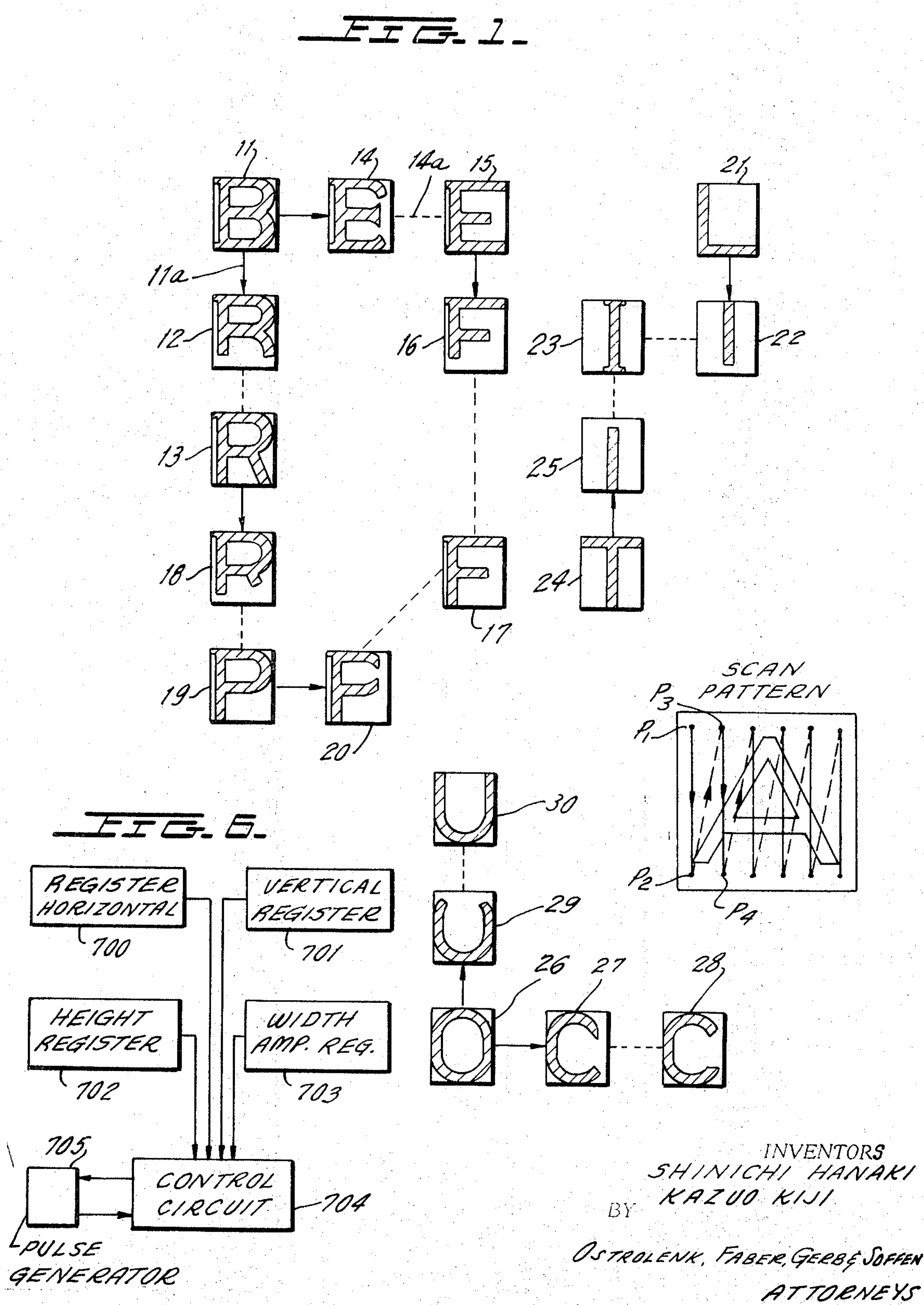
FIG. 6 is a block diagram showing the location and size control registers for the scanner of FIG. 2.

Referring now to the drawings, FIG. 1 shows a plurality of alphabetic characters useful in describing the operation and advantages of the instant invention. Some of the alphabetic characters shown therein have portions, for example, the upper portions thereof, which are of much lighter contrast than normal, so that these upper portions are lost to the pattern recognition system as a result of their producing signals which are below the threshold level for output signals developed by the photoelectric conversion means. Also shown therein are a plurality of other letters which closely resemble those having obscured or dim portions. The light contrasting portions of characters may result from a variety of causes, the major reasons for which are pressure differentials of printing types or the lack of uniformity, causing the dim or lightly contrasted portions of the characters to be so at only one portion of the character such as, for example, the upper or lower end or the right or left-hand end. It is seldom found that both portions of the upper and lower ends of a character are dim and the middle is black.

Character pattern 11 of FIG. 1 is a normal alphabetic character B. If the lower portion of character 11 is missing, this may result in the character recognition system generating a binary electric signal represented by the character 12. The pattern 12 is quite similar to an alphabetic R, and there is a possibility of misinterpreting the identity of the character unless severe discrimination is carried out.

As another example, it is quite possible to mistake the pattern 18 which may originally have been the letter R for which the lower right-hand portion has been lost, for the alphabetic character P, as shown by pattern 19.

FIG. 1 also shows that if the side of a letter from which an arrow originates such as, for example, the arrow 11*a*, has been removed or otherwise obscured, it then resembles a pattern which is shown adjacent the arrow end of the line, for example, line 11*a*, and thus the latter pattern is apt to be mistaken for a pattern indicated as being connected to the converted pattern with a dashed line such as, for example, the dashed line 14*a*. For example, it is most difficult to discriminate pattern 20 wherein the right-hand portion of the alphabetic letter P, of pattern 19, has been lost, from the alphabetic F of a pattern 17. Similarly, an alphabetic pattern 16 in which the lower end of an alphabetic E of pattern 15 has been lost, or otherwise obscured, is difficult to be distinguished from the alphabetic character F of pattern 17. In a like manner, the pattern 22 may result from a case in which the alphabetic character L as shown by pattern 21 has lost its lower end may be mistakenly identified for the alphabetic character I, as shown by pattern 23, and the pattern 25 may originally have been an alphabetic character T shown by pattern 24, whose top end has been obscured so as to be mistakenly identified as the alphabetic character I, as shown by pattern 23.

FIG. 1 shows still further examples wherein the alphabetic character O as shown by pattern 26 in which the top end has been obscured, as shown by pattern 29, may be mistakenly identified as the alphabetic character U, as shown by pattern 30. Still further, the alphabetic character O, as shown by pattern 26 in which the right-hand portion thereof has been obscured, as shown by pattern 27 may be mistakenly identified as the alphabetic character C, as shown by pattern 28.

FIG. 1 shows some partial patterns which will generate corresponding binary electric signal patterns in order to clearly indicate situations which may occur during pattern recognition. However, even though an analog electrical signal which is converted from an optical spatial pattern is handled as it is, it will be impossible to obtain a current variation so as to exhibit a clear pattern at the time of recognition from a pattern which produces the partially lost binary electric signal as a result of distortion in the original pattern which results in a similarly bad effect upon the recognition procedure. It is thereby difficult to tell whether the distortion has occurred as a result of the electrical recognition operation or as a result of scanning a character of non-uniform contrast.

Figure 2:
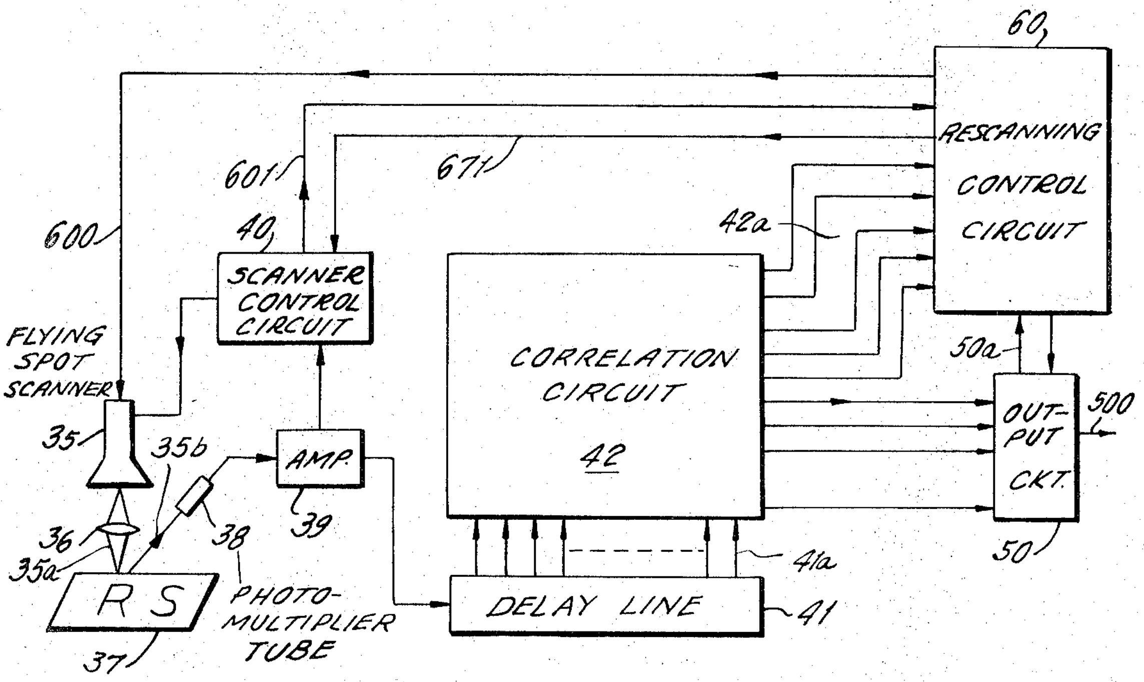
FIG. 2 is a block diagram showing a pattern recognition system designed in accordance with the principles of the instant invention.

FIG. 2 shows a pattern recognition system designed in accordance with the principles of the instant invention and which is comprised of a flying spot scanner 35 developing a beam 35*a* which is focused by a lens system 36 upon the surface of a paper or other document 37 on which patterns (i.e. alphabetic characters) have been printed, written or otherwise formed. Reflected light of beam 35*a* identified by line 35*b* is received by a photomultiplier tube 38 and converted into an electrical signal proportional to the intensity of the reflected light. The output of the photomultiplier tube is applied to an amplifier 39 which amplifies the output signal to a suitable level.

The scanning beam of the flying spot scanning tube scans much in the same manner as an ordinary television set or oscilloscope such that the beam scans the surface of the document under control of vertical and horizontal saw-tooth deflection signals applied to the flying spot scanning tube by a control circuit 40 to form a substantially saw-tooth scan, as is shown best in FIG. 1. The amplitude of the saw-tooth scan and the absolute position thereof are limited so that the area defined by the scanning field is a substantially rectangular area of slightly larger dimension than that occupied by any one character so as to leave little or no margin about the outline of the character. The path of the scan in the embodiment of the instant invention is such that the scanning beam begins at a point $P_1$ (see FIG. 1) which is near the upper left-hand end of the document. The scanning beam moves downwardly in an almost vertical direction and, upon reaching its lowermost point $P_2$, flies back substantially instantaneously to point $P_3$ so as to repeat the scan by describing a line which terminates at point $P_4$, which line is parallel and closely adjacent to the first scanning line described between points $P_1$ and $P_2$. Additional scanning lines are arranged in a similar manner, as can clearly be seen from a consideration of the scan pattern shown in FIG. 1.

The amplified output signal developed by amplifier 39 is applied to the input of a delay line 41. The total delay time of delay line 41 is designed to be almost equal to a time duration necessary to complete the scan of one character on the surface of document 37 or to be slightly greater than that time duration. The delay line is provided with a plurality of taps which are coupled by the leads 41*a* from delay line 41 to selected inputs of a correlation circuit 42. The train of electrical signals of a scanned character which are obtained as a result of the scanning operation are distributed spatially along the delay line 41. Thus, the signals appearing at each of the taps along the delay line are spatially related to the scan of the character performed by the beam of the flying spot scanner. All of the leads are connected in parallel to correlation circuits within the correlation circuitry 42.

The correlation circuits (not shown)—in which an inherent weight group is assigned for each letter to be recognized—is comprised of a plurality of resistor adder circuits connected respectively with each lead 41*a* coupled to delay line 41. A detailed description of such correlation circuits is set forth in the text "Optical Character Recognition" written by George L. Fischer, Jr. et al., published by McGregor Warner Company and appears on pages 51–57 and 136. A detailed description of the correlation circuits will thereby be omitted for purposes of simplicity.

For the purpose of the instant invention, it is sufficient to understand that correlation circuits for each letter are classified into four groups. For example, the alphabetic characters A, B, C . . . , X, Y and Z are classified in the following manner:

The first group of correlation circuits are provided for letters which are not similar in shape to any other letters, for example, the letters A, H, X, etc., whose weight in recognizing the group of letters is taken loosely. In other words, the correlation circuits are arranged so that even though these letters which are applied to the correlation circuits contain electrical signals which are partially obscured or lost, a sufficient output may appear at only one correlation circuit related with that letter so as to clearly establish its identity.

Each output of the correlation circuits for the letters belonging to the first group is led directly to an output circuit 50, is recognized thereby, and is directed to peripheral circuitry or display means (not shown) via the output lines 500.

The second general group includes letters which, by virtue of their configurations, are similar or generally resemble other alphabetic characters such as is shown in FIG. 1, namely, B, R, P, E, F, L, I, T, O, U and C. It is specified that comparatively severe criteria be applied to these alphabetic characters for purposes of recognition so that they will not be mistaken for another letter which they generally resemble. Accordingly, therefore, if an electrical signal is missing in an important elemental area of the pattern when applied to the correlation circuit, it will frequently occur that the correlation circuit will fail to produce an output sufficient for reliable recognition of the character. Thus, the second group is further subdivided into Group IIA and a Group IIB. The Group IIA comprises letters such as, for example, F, I and C which letters, if a portion thereof is lost, tend to resemble one another quite closely. The outputs of the correlation circuitry 42 for these letters are led to output circuit 50 and further to a rescanning control circuit 60 via lines 50*a*.

The Group IIB includes all of the letters of Group II, except for those letters of Group IIA and the outputs of the correlation circuitry 42 are directly applied to the output circuit 50 and are led to the peripheral circuitry (not shown) via the output lines 500.

The third group of characters comprises letters which are difficult to be recognized as letters, for example, the patterns 12, 14, 18, 20 and 29, illustrated in FIG. 1, and a particular weight is set for each of these patterns and a separate circuit is provided therefor as well. The outputs of the correlation circuits for these patterns are led directly to the rescanning control circuit 60 via a selected one or ones of the lines 42*a*.

When the outputs of the correlation circuits for Groups IIA and III are produced, a rescanning start signal is sent from the rescanning control circuit 60 by means of a line 671, causing saw-tooth waveforms to be generated at the flying spot control circuit 40 in order to cause the flying spot scanner to operate in the same manner as was previously described. On the occasion of the rescanning operation, a signal is sent from the rescanning control circuit 60 via the line 600 to the flying spot scanning tube 35 to cause its beam to be more brightly illuminated by a certain amount by increasing the brightness of the tube to an amount greater than normal while the rescanning operation is being carried out for a well-defined portion thereof. The portion of the scanning field which is to be more brightly illuminated is set in accordance with the outputs of the correlation circuits 42 in the manner shown best in FIG. 3, as will be more fully described. For example, let it be assumed that the letter being scanned has the pattern 12 shown in FIG. 1, which is an alphabetic character B whose lower portion is lost. Thus, the portion which is to be scanned by a beam of greater than normal brilliance is defined as that shaded area 12*b* of the rectangle 12*a* associated with pattern 12 in FIG. 3. For other obscured letters, the scanning shift area (i.e., the area to be scanned with a beam of greater than normal brilliance) is similarly shown in a rectangle to the right of each character pattern, whereas the area of the rectangle which has not been shaded will be scanned with a beam of normal brilliance (i.e., of the brilliance of the first or original scan).

Figure 4:
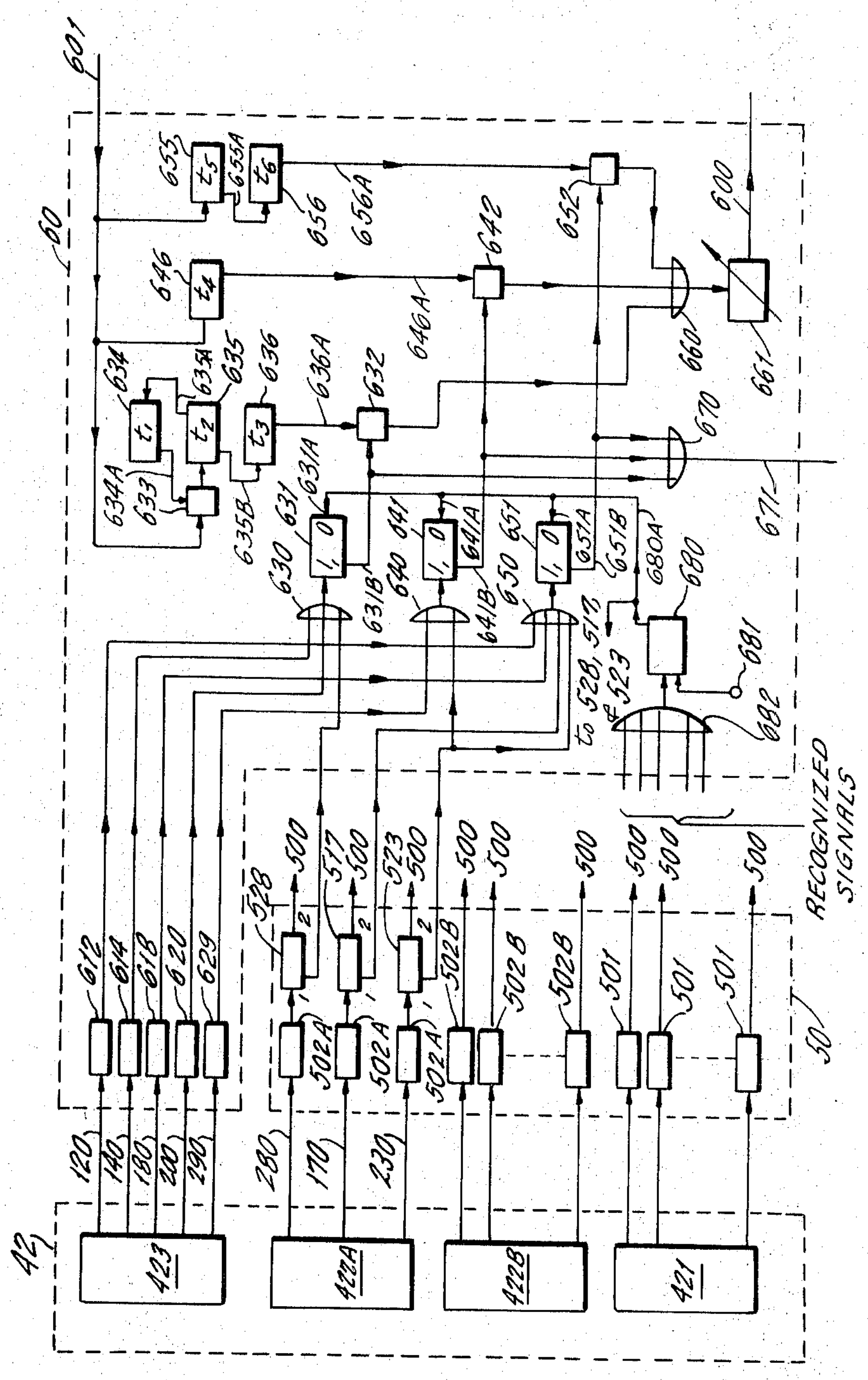
FIG. 4 is a circuit diagram showing the output circuits and rescanning control circuit of the embodiment of FIG. 2 in greater detail.

FIG. 4 is a schematic diagram showing in detail the output circuit 50 and the rescanning control circuit 60 of FIG. 2. In FIG. 4, blocks 421, 422A, 422B and 423 represent the correlation circuits for all the letters divided into the four main groups previously described. Each group is provided with a plurality of corresponding correlation circuits. For the letters belonging to Group I, the outputs are derived from the correlation circuits included in block 421, and these outputs are applied to an associated one of the plurality of threshold circuits 501. If the applied signal is higher than a certain threshold value set for each threshold circuit, that signal is sent to its associated output line 500 as a binary ONE signal, thereby becoming a recognition output. It should be understood that the above described threshold value is set so as not to produce two or more recognition outputs at the output terminals 500 associated with the threshold circuits 501.

In a similar manner, the characters classified in Group IIB are obtained by correlation circuits provided in the block 422B. The outputs of the correlation circuits are applied to the threshold circuits 502B which are similar in design and function to threshold circuits 501, so as to cause recognition output signals to be provided at a selected one of the output lines 500 associated with threshold circuits 502B.

The correlation circuits relating to the characters classified in Group IIA are contained within block 422A and their outputs are applied respectively to the two-bit counter circuits 528, 517 and 523, respectively, after having passed through the threshold circuits 502A, respectively.

Each of the counter circuits 528, 517 and 523 is substantially identical in structure, and is provided with two output terminals "1" and "2" which, upon being reset prior to the initial scanning operation, is in a binary ZERO state. When one input signal is applied to one of the threshold circuits 502A which is equal to or greater than the threshold level, the counter will cause a binary ONE output to appear at its "1" terminal. When one additional input is applied to the threshold circuit for the same counter which is equal to or greater than the threshold level, the threshold circuit will cause the counter to provide a binary ONE output at its "2" output terminal. Thus, if one of the threshold circuits 502A is supplied with a signal of sufficient strength from its associated correlation circuit included in the group 422A, it produces a binary ONE output. This signal, in turn, changes the output of counter circuit 528, for example, from ZERO to binary ONE at its "1" terminal, which counter circuit is related to the alphabetic character C. If no further signal passes through the threshold circuit 502A coupled to counter 528 through the scan of the character, no binary ONE output will be developed at the "2" terminal of counter 528, causing the decision of the identity of the alphabetic character C to be deferred.

Figure 3:
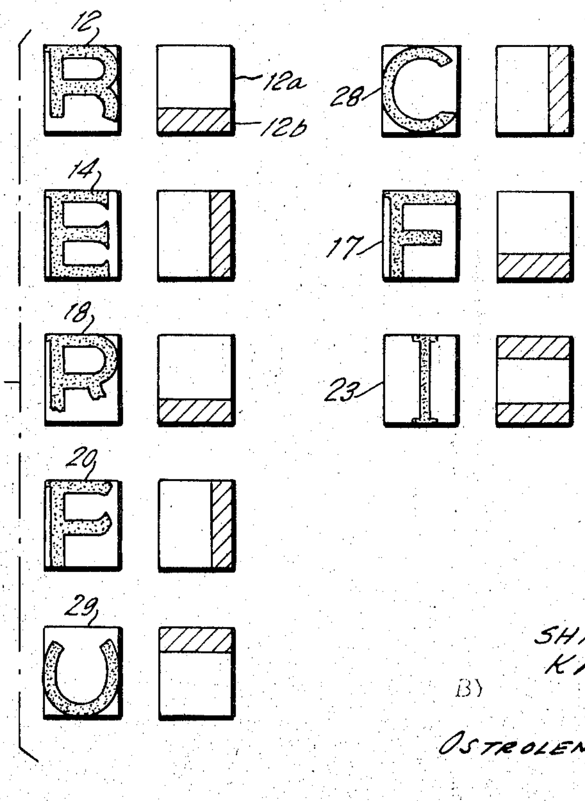
FIG. 3 is a diagram showing a plurality of alphabetic characters and associated therewith scanning regions having cross-hatched areas for which the conversion level is to be respectively shifted in correspondence with said patterns when they are rescanned.

In this case, the binary ONE output appearing at the "1" terminal of counter 528 is applied to the rescanning control circuit 60, causing the rescanning operation to be initiated with the scanning beam being of greater than normal brilliance in the shaded region shown in the rectangle adjacent to pattern 28 of FIG. 3, which operation occurs in a manner to be more fully described. If the identity of the alphabetic character C is recognized again, a binary ONE output will appear at the "2" terminal of counting circuit 528, causing the character which has been rescanned to be reliably recognized as the alphabetic character C.

If, as a result of the rescan, the rescanned character is identified as a letter O, the correlation circuit output of the letter C contained in block 422A will not be of sufficient amplitude to apply power to counting circuit 528, causing it to remain in the state where a binary ONE signal appears at its "1" output so that no output will be developed at the terminal 500 associated therewith. In this case, however, a sufficient output is obtained at a correlation circuit related to the alphabetic character O included in Group IIA which, in turn, produces a binary ONE output at the threshold circuit related to the character O so that the identity of the original pattern will now be recognized as being the alphabetic character O. As soon as the recognition output is obtained, the counting circuit 528 is reset so that its "1" and "2" terminals return to binary ZERO levels. The same procedure is also applicable to the alphabetic characters F and I for which the counters 517 and 523, respectively, are provided. For letters belonging to the Group III classification, the outputs of correlation circuits which are provided in block 423 are applied respectively to the threshold circuits 612, 614, 618, 620 and 629. The output of each of these threshold circuits is not employed as a recognition output, but is utilized as a signal which causes a rescanning operation to be initiated. For the purpose of rescanning the specified portion of the scanning field with a beam of greater than normal brilliance, the brightness modulation voltage is applied to the flying spot scanner tube 35, shown in FIG. 2, so as to make the beam brighter when it impinges upon an area wherein the light spot is desired to be of greater brightness. The position of the beam at any given instant is obviously determined by the vertical-horizontal deflection saw-tooth signals applied to tube 35.

Referring again to FIG. 4, there is provided therein a plurality of OR gates 630, 640 and 650 which are respectively associated with decisional outputs of the characters classified in Groups III and IIA, and a predetermined combination of signals is applied to these gates so that, upon the initiation of a rescanning operation, one particular area of the scanning field will be illuminated by a beam of greater than normal brilliance, with the brightness being controlled in accordance with the decisional circuitry.

Considering the patterns shown in FIG. 3, it should be noted that the identifying numerals in FIG. 3 are related to the output lines of the correlation circuits provided in blocks 423 and 422A. For example, output line 120 is related to pattern 12; output line 140 is related to pattern 14, etc. It can be seen that the output lines from correlation circuits 423 and 422A are substantially identical to those patterns shown in FIG. 3, except that a zero has been added to the right-hand end of each number. In a like manner, the threshold circuit 612 corresponds to pattern 12, except that the number 6 has been added to the left-hand end. With regard to the two-stage counters 528, 517 and 523, these counters are related to the patterns 28, 17 and 23, respectively, as shown in FIG. 3, with the addition of a numeral 5 placed at the left-hand end of each pattern number, thus, providing a direct correlation between the threshold circuits 612, 614, 618, 620 and 629 and the patterns to which they relate and the two-stage counters 528, 517 and 523 and the patterns to which they relate.

The circuitry of FIG. 4 further includes an OR gate 630 having input terminals respectively connected to the outputs of threshold circuits 614 and 620 and to the "1" output of counting circuit 528. The output of OR gate 630 is coupled to the set input terminal of "right-hand" flip-flop 631. The operation of flip-flop 631 is as follows:

When a binary ONE signal is applied to its set input terminal from the output of OR gate 630, its output terminal 631B goes to binary ONE state. Bistable flip-flop 631 may be reset by applying a binary ONE pulse or signal to its reset input terminal 631A. It should be noted that the bistable flip-flops 641 and 651, to be subsequently described, also operate in a similar manner so that when they receive binary ONE levels from their associated OR gates 640 and 650, respectively, their output terminals 641B and 651B, respectively, will go to binary ONE state. The flip-flops may similarly be reset by application of a binary ONE level signal to their reset input terminals 641A and 651A, causing their output terminals 641B and 651B, respectively, to return to the binary ZERO level.

The OR gate 640 has its input terminals coupled to the output of threshold circuit 629 and to the "1" terminal of the counting circuit 523. The output of OR gate 640, when at binary ONE level, sets the "upper" flip-flop 641 to binary ONE state at its output terminal 641B.

OR gate 650 is provided with four input terminals which are respectively coupled to the output terminals of threshold circuits 612 and 618 and to the "1" terminals of counting circuits 517 and 523, respectively. In a similar manner, the output or OR gate 650, when at binary ONE, will set the "lower" flip-flop 651 to cause its output terminal 651B to go to binary ONE state.

The operation of the flying spot scanner of FIG. 2 is as follows:

A pulse train is generated at the beginning of each scanning operation such that each pulse is initiated upon the beginning of each scanning line, which pulses are applied to the flying spot scanner by control circuit 40. This pulse train is also coupled by line 601 to the rescanning control circuit 60 shown in FIG. 4. The waveform representing this pulse train is identified in FIG. 5 as waveform 6010.

Figure 5:
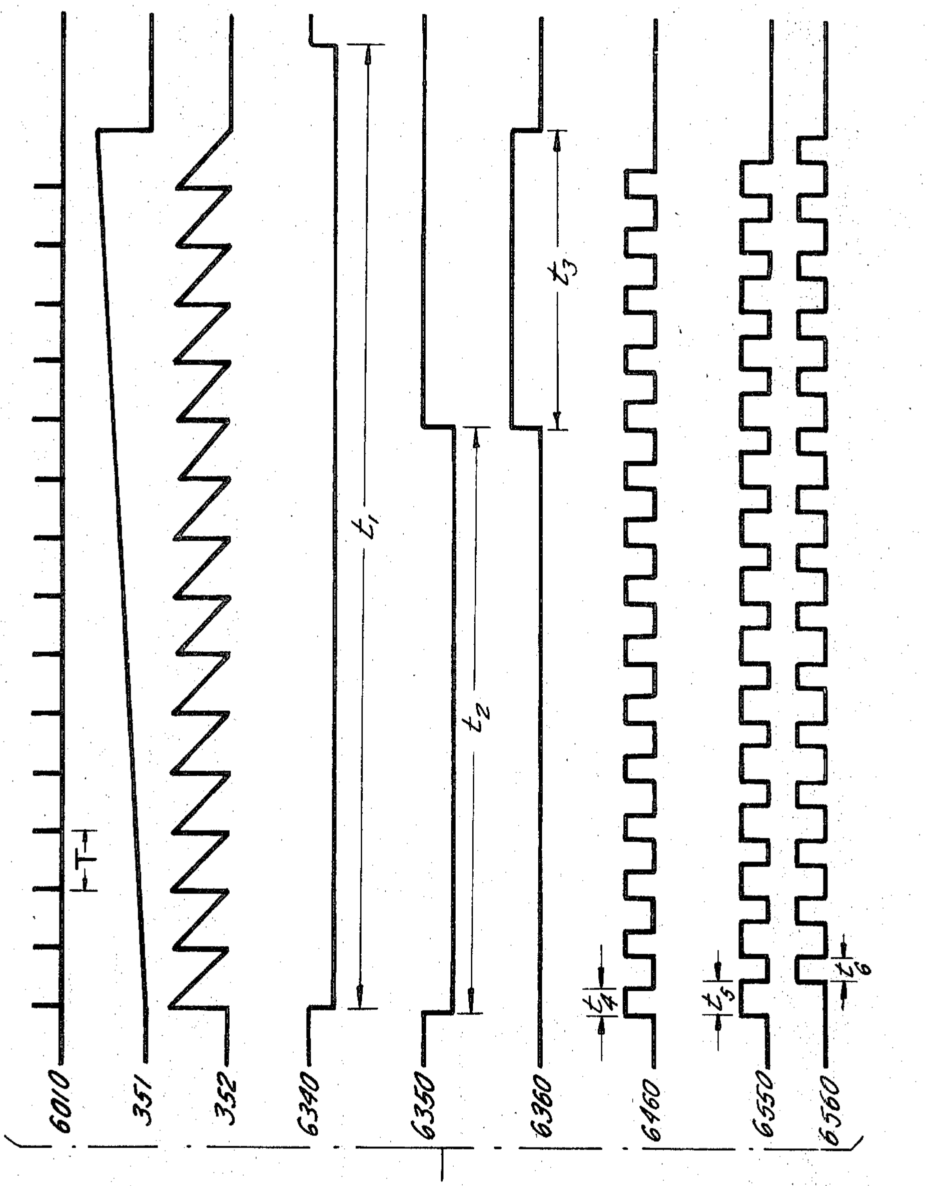
FIG. 5 shows a plurality of waveforms useful in describing the circuits of FIGS. 2 and 4.

The saw-tooth waveforms 351 and 352, shown beneath waveform 6010 in FIG. 5, are the deflection signal waveforms which are respectively applied to the horizontal and vertical beam driving circuits (not shown) of the flying spot scanner tube 35, which signals originate in the flying spot scanner control circuit 40. Obviously, saw-tooth waveform 351 is employed to move the beam horizontally from left to right at a rather slow rate of speed, while saw-tooth waveform 352 is designed to move the beam vertically upward and downward at a much higher rate of speed.

Insofar as the remaining waveforms of FIG. 5 are concerned, each portion of these waveforms which are of relatively high level correspond to a binary ONE state, and each portion of the waveforms which is at a relatively low level corresponds to a binary ZERO state.

Referring again to FIG. 4, the pulses 6010 appearing in line 601, shown near the upper right-hand end of FIG. 4, are applied to the input of a monostable multivibrator 635 by means of a two-input AND gate 633 which immediately triggers monostable multivibrator 634. This operation occurs as follows:

As is well known in the art, a monostable multivibrator in its quiescent state maintains its 1 (or sometimes 2) outputs(s) at a predetermined binary level. When set with a trigger pulse, the monostable multivibrator switches to its opposite state, reversing the binary level at its 1 (or possibly 2) output(s) for a predetermined time duration after which it automatically resets to its quiescent state. The quiescent state of monstable multivibrator 634 is such that its output terminal 634A is at binary ONE level so as to normally enable AND gate 633. As soon as one of the pulses of pulse train 6010 is applied to the other input of AND gate 633, AND gate 633 generates a pulse at its output terminal to trigger monostable multivibrator 635, causing its output terminal 635A to immediately go to binary ONE level, triggering monostable multivibrator 634 so as to cause its output terminal 634A to go to binary ZERO level. This inhibits AND gate 633 from passing subsequent pulses in pulse train 6010 until monostable multivibrator 634 automatically resets. The monostable multivibrator 634 automatically resets to its quiescent state after a time duration $t_1$, as shown by the waveform 6340 of FIG. 5.

Monostable multivibrator 635 also emits a signal at its output terminal 635B which triggers monostable multivibrator 636 after a time duration $t_2$ from the time in which monostable multivibrator 635 was initially triggered into operation. In other words, when monostable multivibrator 635 is triggered by the output of AND gate 633, its output terminals 635A and 635B go to binary ONE and binary ZERO levels, respectively. Monostable multivibrator 635 then automatically resets itself to its quiescent state, causing the levels at output terminals 635A and 635B to go to binary ZERO and binary ONE, respectively. Thus, the trailing edge of the square pulse developed at output terminal 635B is employed to trigger monostable multivibrator 636. The waveform showing the operational relationship of the monostable multivibrators 634, 635 and 636 are designated in FIG. 5 by the numerals 6340, 6350 and 6360, respectively.

Assuming that the time duration of each line scanned is T and that one scanned field is comprised of fifteen scan lines, for the purpose of causing the above described monostable multivibrator to operate so as to scan approximately the right-hand one-third of the scanning area with a brighter than normal beam, the time duration $t_1$ for reset of monostable multivibrator 634 is selected so as to be slightly greater than 15T; the time duration $t_2$ for reset of monostable multivibrator 635 is arranged to be equal to about 10T; and the time duration $t_3$ for reset of monostable multivibrator 636 is arranged to be equal to about 5T. These relationships can easily be seen from the waveforms 6010, 6340, 6350 and 6360, respectively.

The output of monostable multivibrator 636 is coupled through output line 636A to one input of OR gate 660 through "right-hand" AND gate 632 which is enabled when the output line 631B of "right-hand" flip-flop 631 is at the binary ONE level. The pulses 6010 are also applied to a monostable multivibrator 646 having a reset time duration $t_4$ so as to generate an output waveform designated by the numeral 6460 in FIG. 5. The time duration $t_4$ is selected so as to be almost equal to $T/3$ so as to scan approximately the upper one-third of the scanning region with a brighter than normal light beam. The output of monostable multivibrator 646 is coupled through its output line 646A to a second input of OR gate 660 through "upper" AND gate 642 which is enabled when the output terminal 641B of "upper" flip-flop 641 is in the binary ONE state.

The pulses of waveform 6010 also trigger a monostable multivibrator 655 which initially causes its output terminal 655A to go to binary ONE level and, after a time duration $t_5$, automatically resets to its quiescent state, causing its negative going trailing edge to trigger a monostable multivibrator 656 whose output line immediately goes to binary ONE level, remains here for a time duration $t_6$ until the monostable multivibrator resets to its quiescent state at the end of time duration $t_6$. The waveforms developed by monostable multivibrators 655 and 656 are respectively identified in FIG. 5 by the numbers 6550 and 6560, and their timing relationships relative to the scanning signals 352 and pulses 6010 can easily be seen.

In order to scan the lower one-third of the scanning area with a brighter than normal beam, time duration $t_5$ is arranged to be equal to about $2T/3$, while the time duration $t_6$ is designed to be approximately $T/3$. The output of monostable multivibrator 656 is coupled through its output line 656A to the third input of OR gate 660 by means of "lower" AND gate 652 which is enabled when the output terminal 651B of "lower" flip-flop 651 goes to binary ONE level.

The output of OR gate 660 is applied to the input of an analog adding circuit 661. The adding circuit 661 is employed for the purposes of applying the brightness modulating signal to the flying spot scanning tube via a line 600 and the arrow through the circuit indicates that the output voltage of circuit 661 may be manually adjusted to generate a voltage of a predetermined value at its output line 600 when a binary ONE signal is emitted from OR gate 660, provided that this voltage is increased by a proper amount at that time. In this manner, during the rescanning time, the beam will be caused to increase its intensity during a portion of the scanning period, with the particular selected portion or portions being determined in accordance with the decisional logic obtained as a result of the first scanning operation.

After an initial scanning operation and an evaluation of that scanning operation has been performed by the decisional circuitry, the appearance of a binary ONE level signal at the outputs of any one of the "right-hand," "upper" and "lower" flip-flops 631, 641 and 651, respectively, indicates that it is necessary to perform a rescanning operation upon the character which has just been scanned. This binary ONE level signal is coupled to the flying spot control circuit 40 via the line 671. The signals at the outputs of these flip-flops are gathered from their output lines 631B, 641B and 651B, respectively, and applied to respective inputs of OR gate 670 so that when any one or more of these output lines are in the binary ONE state, OR gate 670 will emit a binary ONE level signal at its output line 671 to initiate a second scanning operation of the marginal character.

The "right-hand," "upper" and "lower" flip-flops 631, 641 and 651, and the counting circuits 528, 517 and 523 are all returned to their "reset" state before the initial scanning operation by means of a properly delayed output pulse of monostable multivibrator 680 which is triggered by means of a manual switch 681, or any other suitable signals. In addition thereto, after the recognition output has been obtained as a result of scanning, it is also necessary to reset these circuits. OR gate 682 is thereby provided to perform this function. OR gate 682 is provided with a plurality of inputs, each being coupled to the "2" terminals of counting circuits 528, 517 and 523 and to the outputs of all the threshold circuits 502B, and the outputs of all the threshold circuits 501, respectively. Thus, when one or more of the inputs to OR gate 682 are at binary ONE level, the OR gate will emit a binary ONE signal to trigger monostable multivibrator 680, causing its output line 680A to go to binary ONE level. This output line is coupled to the reset input terminals of flip-flops 631, 641 and 651 and to the reset input terminals (not shown) of the counters 528, 517 and 523, respectively. Thus, if any of the outputs used for recognizing valid characters generates a binary ONE level, all of the memory circuits 528, 517, 523, 631, 641 and 651 are automatically reset.

The flying spot scanner control circuit 40, shown in FIG. 2, is further provided with horizontal and vertical direction registers 700 and 701, as shown in FIG. 6, which memorizes the coordinates of one point on the written document as a starting point, and is further comprised of a combination of height and width amplitude memory registers 702 and 703, respectively, for memorizing the height and width (i.e., the length of the sides) of the character which was scanned, and further is comprised of a control circuit 704 which accepts the information stored in each of the above mentioned registers during a preliminary scanning operation so as to control the horizontal and vertical saw-tooth wave generating means, as well as for adjusting the impulse train generator 705 which applies pulses thereto in order to simply and readily initiate a rescanning operation. Each of the registers 700 through 703 is comprised of a plurality of stages sufficient for memory purposes and accumulates its stored information in accordance with the initial scan.

A detailed description of these circuits has been eliminated herein for purposes of simplicity, since they may be easily designed in accordance with conventional techniques in the pulse and digital field.

Whereas the preferred embodiment described herein teaches the level control of the information mode conversion as being performed by increasing the brightness of the flying spot scanner tube beam, it should further be understood that as an alternative scheme the gain of amplifier 39 may be increased in a like manner while the intensity of the beam is kept constant during the rescanning operation so that the gain of the amplifier may be increased during the scanning of the critical portions, as shown by the hatched or shaded areas of the rectangles of FIG. 3. It can clearly be seen, therefore, that in order to obtain a digital signal, a similar result will be achieved by altering the gain of amplifier 39 which provides the effect of altering the slicing or threshold level for incoming signals representing elemental areas of the scanned field. This may be achieved by coupling the output of circuit 661 to the gain control input of amplifier 39.

Whereas the preferred embodiment further teaches the use of a flying spot scanner for the photoelectric conversion operation, any other means which can repeatedly scan the same points on the surface of the document may be substituted therefor. For example, a plurality of photodetectors arranged in a regular matrix of columns and rows may be employed in place of the flying spot scanner means. Thus, employing the circuitry of the instant invention as a basis for such a system, it is possible to employ a circuit which, upon the occasion of the information mode conversion, causes the threshold level of selected ones of the fixed photoelectric cells to be shifted for that portion, or those portions, of the scanned field related to the decisions obtained during the first scan operation. Pattern recognition employing the correlation method is, from the point of view of feature detection, equivalent to recognition based upon an investigation of whether or not certain specific features appear in predetermined patterns with respect to the features of at least as many as the number of each stored pattern class. As compared with this arrangement, it is essentially the same to recognize the codes which have been converted from locally existing features that had been extracted from a pattern by collating them with codes which have been specified for each pattern class. Even though codes obtained during the first scanning operation are too imperfect to be recognized owing to the fact that their conversion levels were obscured when the patterns were converted, it is possible to obtain perfect codes by limiting the scope of pattern classes to a certain degree, by partially shifting its level in accordance with the method of the instant invention and by performing the recognition treatment a second time. In this case, it is also possible to obtain correct codes by extracting during a second or possibly more than two recognition operations, the feature of only code digits that do not coincide and by amending them on a step-by-step basis.

Although alphabetic characters were treated as one example in the preferred embodiment of the instant invention, it should be appreciated that the instant invention is similarly applicable to other patterns or characters. Still further, although photoelectric conversion was described with relationship to the prefered embodiment, it should also be obvious that the instant invention is similarly applicable to conversion techniques such as photo-to-photo or magneto-to-electro.

In the present embodiment, although the shape of an area in which the scanning operation is carried out wherein a brighter than normal beam is produced was taken as being substantially rectangular, it is further possible to employ any other shape, and such techniques are within the purview of this invention.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. A pattern recognition system for recognizing symbols, letters, numbers and the like imprinted or otherwise formed on the surface of a document comprising:

first means for scanning the region occupied by a character;

second means for converting light reflected from elemental areas of the said region into electrical signals representing light and dark states of each elemental area;

third means for examining said signals to identify the illuminated character;

fourth means for generating a signal to indicate that the scanned character has not been successfully recognized;

fifth means coupled between said fourth means and said first means for causing the unrecognized character to be rescanned;

said fifth means including means coupled to one of said first and second means for altering the signal levels of signals related to a predetermined portion of said region to facilitate re-evaluation by said third means;

said first means comprising a flying-spot scanning tube means and control means for causing said tube means to generate a beam for scanning said region;

said fifth means being coupled to said tube means for increasing the brightness of said beam during periods when the beam scans selected portions of said region;

said fifth means being further comprised of timing means including first, second and third timing circuits each being adapted to generate first, second and third timing signals which are present during the times that said beam respectively scans first, second and third portions of the region containing a character;

first, second and third normally closed gate means each being coupled between said first, second and third timing circuits respectively, and said first means and being selectively enabled by said fourth means for increasing the brilliance of said first means during the scanning of said first, second and third portions of said region;

first, second and third bistable flip-flops coupled between said fourth means and said first, second and third gate means respectively for selectively storing a signal generated by said fourth means;

OR gate means for coupling the outputs of said first, second and third gate means to said tube control means.

2. The system of claim 1 further comprising means coupled to said third means for resetting said first, second and third flip-flops when a valid character has been recognized.

3. The system of claim 1 wherein said third means is comprised of a plurality of threshold circuit means for generating signals when a marginal character which may resemble another character has been received;

said threshold circuit means being divided into three groups; first, second and third OR gate means coupling said first, second and third groups respectively of threshold circuit means respectively to ones of said first, second and third flip-flops for causing the brilliance of said beam to be increased in scanning selected portions of a character region during a rescanning operation.

4. The system of claim 3 wherein said flying-spot scanning tube means is further comprised of means for returning said beam to the proper location to begin the rescanning operation.

References Cited

UNITED STATES PATENTS

| | | | |
|---|---|---|---|
| 2,904,629 | 9/1959 | Scherbatskoy | 178—6.8 |
| 3,146,422 | 8/1964 | Greanias et al. | 340—146.3 |
| 3,263,216 | 7/1966 | Andrews | 340—146.3 |
| 3,303,463 | 2/1967 | Hamburgen | 340—146.3 X |
| 3,379,826 | 4/1968 | Gray | 340—146.3 X |

MAYNARD R. WILBUR, Primary Examiner

L. H. BOUDREAU, Assistant Examiner